United States Patent
Santos et al.

(10) Patent No.: US 11,706,465 B2
(45) Date of Patent: Jul. 18, 2023

(54) ATSC 3.0 ADVERTISING NOTIFICATION USING EVENT STREAMS

(71) Applicant: Sony Corporation, Tokyo (JP)

(72) Inventors: Charlemagne Aguilar Santos, San Diego, CA (US); Tanmay Agnihotri, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 104 days.

(21) Appl. No.: 16/275,078

(22) Filed: Feb. 13, 2019

(65) Prior Publication Data
US 2020/0228851 A1   Jul. 16, 2020

Related U.S. Application Data

(60) Provisional application No. 62/792,450, filed on Jan. 15, 2019.

(51) Int. Cl.
*H04N 21/234* (2011.01)
*H04N 21/61* (2011.01)
*H04N 21/81* (2011.01)

(52) U.S. Cl.
CPC ... *H04N 21/23424* (2013.01); *H04N 21/6125* (2013.01); *H04N 21/812* (2013.01)

(58) Field of Classification Search
CPC ............................ H04N 21/234; H04N 21/235
See application file for complete search history.

(56) References Cited

U.S. PATENT DOCUMENTS

| | | | |
|---|---|---|---|
| 6,005,938 A | 12/1999 | Banker et al. | |
| 6,373,904 B1 | 4/2002 | Sakamoto et al. | |
| 6,393,562 B1 | 5/2002 | Maillard | |
| 6,584,199 B1 | 6/2003 | Kim et al. | |
| 6,920,222 B1 | 7/2005 | Tsukahara et al. | |
| 7,062,779 B1* | 6/2006 | Courtney | H04N 21/4431 348/E5.005 |

(Continued)

FOREIGN PATENT DOCUMENTS

| | | |
|---|---|---|
| WO | 2016140479 A1 | 9/2016 |
| WO | 2016178494 A1 | 11/2016 |

(Continued)

OTHER PUBLICATIONS

Agnihotri et al., "ATSC 3.0 Playback Using MPEG Media Transport Protocol (MMTP)", related U.S. Appl. No. 15/925,190, Non-Final Office Action dated Oct. 7, 2020.

(Continued)

*Primary Examiner* — Mushfikh I Alam
(74) *Attorney, Agent, or Firm* — John L. Rogitz (57) ABSTRACT

An Event Streams 'event' which contains information about ads is sent via ATSC 3.0 to a receiver player along with an xlinkResolution signal. This information includes but is not limited to time stamps for when the ads will start and stop. When this xlinkResolution is sent to the receiver player, the receiver player sends a notification to a broadcaster app containing the information about start and stop time for presenting the ad. Using this information, the broadcaster app updates itself so that, for example, the broadcaster app can present a message on a user interface regarding the subject of the ad, or present content related to but different from the ad along with the ad itself.

14 Claims, 5 Drawing Sheets

(56) References Cited

U.S. PATENT DOCUMENTS

| | | | |
|---|---|---|---|
| 8,401,191 | B2 | 3/2013 | Chen et al. |
| 8,671,422 | B2* | 3/2014 | Foti ................ H04N 21/8455 725/22 |
| 8,918,805 | B2* | 12/2014 | Canova ............ H04N 21/23614 725/136 |
| 9,002,006 | B2 | 4/2015 | Chen et al. |
| 11,012,761 | B1* | 5/2021 | Fay ...................... H04H 20/93 |
| 2003/0073402 | A1* | 4/2003 | Herring ................ H04H 60/64 455/2.01 |
| 2003/0172376 | A1* | 9/2003 | Coffin, III ............ H04N 21/258 725/22 |
| 2005/0198680 | A1 | 9/2005 | Baran et al. |
| 2006/0004661 | A1 | 1/2006 | Bacon |
| 2006/0053442 | A1* | 3/2006 | Ridderheim ....... H04N 21/6543 725/32 |
| 2007/0098165 | A1 | 5/2007 | Yoshikawa |
| 2008/0168133 | A1 | 7/2008 | Osborne |
| 2009/0136203 | A1 | 5/2009 | Stam et al. |
| 2009/0296535 | A1 | 12/2009 | Jones et al. |
| 2011/0142139 | A1 | 6/2011 | Cheng et al. |
| 2012/0042335 | A1* | 2/2012 | Hwang ................ H04N 21/812 725/32 |
| 2012/0144417 | A1* | 6/2012 | Khader .............. H04N 21/8166 725/32 |
| 2012/0167133 | A1* | 6/2012 | Carroll ............... G06Q 30/0251 725/32 |
| 2012/0192220 | A1* | 7/2012 | Wyatt .............. H04N 21/26241 725/30 |
| 2012/0304046 | A1* | 11/2012 | Neill .................... G06F 16/4393 715/209 |
| 2012/0307654 | A1 | 12/2012 | Pantos et al. |
| 2013/0007799 | A1* | 1/2013 | Sandoval ......... H04N 21/25883 725/32 |
| 2013/0326553 | A1 | 12/2013 | Nicolas |
| 2013/0332976 | A1 | 12/2013 | Shenker et al. |
| 2014/0325572 | A1 | 10/2014 | Yie et al. |
| 2015/0100996 | A1 | 4/2015 | Freeman et al. |
| 2015/0195327 | A1 | 7/2015 | Bouazizi et al. |
| 2015/0281799 | A1 | 10/2015 | Lim |
| 2015/0326952 | A1* | 11/2015 | Estevam de Britto ...................... H04N 21/2381 725/132 |
| 2016/0234348 | A1 | 8/2016 | Mao et al. |
| 2016/0234355 | A1 | 8/2016 | Lee et al. |
| 2016/0234682 | A1 | 8/2016 | Mandyam |
| 2016/0360288 | A1 | 12/2016 | Mandyam et al. |
| 2016/0366479 | A1* | 12/2016 | Crowe ............... H04N 21/4396 |
| 2016/0373489 | A1 | 12/2016 | Lee et al. |
| 2017/0034576 | A1* | 2/2017 | Eyer ................ H04N 21/44008 |
| 2017/0054520 | A1 | 2/2017 | Kwak et al. |
| 2017/0070789 | A1* | 3/2017 | Liassides ........... H04N 21/2547 |
| 2017/0134763 | A1 | 5/2017 | Hwang et al. |
| 2017/0302982 | A1* | 10/2017 | Simpson ............ H04N 21/2662 |
| 2017/0374429 | A1 | 12/2017 | Yang |
| 2018/0184136 | A1 | 6/2018 | Oh et al. |
| 2018/0205975 | A1 | 7/2018 | Oh et al. |
| 2018/0288468 | A1 | 10/2018 | Yamagishi et al. |
| 2018/0373847 | A1 | 12/2018 | Lo et al. |
| 2019/0058909 | A1 | 2/2019 | Eyer et al. |
| 2019/0058929 | A1* | 2/2019 | Young .................. H04N 21/233 |
| 2019/0174156 | A1* | 6/2019 | Crawford ......... H04N 21/25883 |
| 2019/0215575 | A1 | 7/2019 | Yang et al. |
| 2019/0246148 | A1 | 8/2019 | Oh et al. |
| 2019/0356944 | A1* | 11/2019 | Patel .................. H04N 21/4316 |
| 2020/0007922 | A1* | 1/2020 | Yun ...................... H04N 21/472 |
| 2023/0042684 | A1* | 2/2023 | Goldberg ........... H04N 21/8586 |

FOREIGN PATENT DOCUMENTS

| | | |
|---|---|---|
| WO | 2016190720 A1 | 12/2016 |
| WO | 2017184648 A1 | 10/2017 |
| WO | 2018202768 A1 | 11/2018 |

OTHER PUBLICATIONS

Agnihotri et al., "ATSC 3.0 Playback Using MPEG Media Transport Protocol (MMTP)", related U.S. Appl. No. 15/925,190, Applicant's response to Non-Final Office Action filed Jan. 5, 2021.

Paul Joseph Hearty, Mark Eyer, "Delivery of Information Related to Digital Rights Management (DRM) in a Terrestrial Broadcast System", related U.S. Appl. No. 16/214,933, Final Office Action dated Mar. 27, 2020.

Paul Joseph Hearty, Mark Eyer, "Delivery of Information Related to Digital Rights Management (DRM) in a Terrestrial Broadcast System", related U.S. Appl. No. 16/214,933, Applicant's response to Final Office Action dated Apr. 3, 2020.

Agnihotri et al., "ATSC 3.0 Playback Using MPEG Media Transport Protocol (MMTP)", related U.S. Appl. No. 15/925,190, Non-Final Office Action dated Jun. 17, 2020.

Agnihotri et al., "ATSC 3.0 Playback Using MPEG Media Transport Protocol (MMTP)", related U.S. Appl. No. 15/925,190, Applicant's response to Non-Final Office Action filed Jun. 20, 2020.

Paul Joseph Hearty, Mark Eyer, "Delivery of Information Related to Digital Rights Management (DRM) in a Terrestrial Broadcast System", related U.S. Appl. No. 16/214,933, Non-Final Office Action dated Dec. 20, 2019.

Paul Joseph Hearty, Mark Eyer, "Delivery of Information Related to Digital Rights Management (DRM) in a Terrestrial Broadcast System", related U.S. Appl. No. 16/214,933, Applicant's response to Non-Final Office Action filed Dec. 24, 2019.

Agnihotri et al., "ATSC 3.0 Playback Using MPEG Media Transport Protocol (MMTP)", related U.S. Appl. No. 15/925,190, Non-Final Office Action dated Dec. 9, 2019.

Agnihotri et al., "ATSC 3.0 Playback Using MPEG Media Transport Protocol (MMTP)", related U.S. Appl. No. 15/925,190, Applicant's response to Non-Final Office Action filed Dec. 13, 2019.

Kim et al., "Method of DASH segments into a MMTP stream for switching contents under a hybrid broadcasting environment" (2017).

Xu et al., "DASH and MMT and their Applications", (2016).

Tanmay Agnihotri, "Advanced Television Systems Committee (ATSC) 3.0 Latency-Free Display of Content Attribute", file history of related U.S. Appl. No. 16/710,746, filed Dec. 11, 2019.

"RFC 4033, DNS Security Introduction and Requirements," Arends, R., Austein, R., Larson, M., Massey, D., and S. Rose, Internet Engineering Task Force, Fremont, CA, Mar. 2005.

"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.

"ATSC Standard: ATSC 3.0 Interactive Content (A/344)", May 2, 2019.

"ATSC Standard: ATSC 3.0 Security and Service Protection", Aug. 20, 2019.

"ATSC Standard: ATSC 3.0 System", Sep. 17, 2019.

"ATSC Standard: Signaling, Delivery, Synchronization, and Error Protection (A/331)", Jun. 19, 2019.

"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.

"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.

"RFC 5289, TLS Elliptic Curve Cipher Suites with SHA-256/384 and AES Galois Counter Mode (GCM)," E. Rescorla, Internet Engineering Task Force, Fremont, CA, Aug. 2008.

"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.

"RFC 5652, Cryptographic Message Syntax (CMS)," R. Housley, Internet Engineering Task Force, Fremont, CA, Sep. 2009.

(56) References Cited

OTHER PUBLICATIONS

"RFC 5751, Secure/Multipurpose Internet Mail Extensions (S/MIME) Version 3.Message Specification," B. Ramsdell, S. Turner, Internet Engineering Task Force, Fremont, CA, Jan. 2010.
"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.
"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.
"RFC 5940, Additional Cryptographic Message Syntax (CMS) Revocation Information Choices," S. Turner, R. Housley, Internet Engineering Task Force, Fremont, CA, Aug. 2010.
"RFC 6960, X.509 Internet Public Key Infrastructure Online Certificate Status Protocol—OCSP," S. Santesson, M. Myers, R. Ankney, A Malpani, S. Galperin, C. Adams, Internet Engineering Task Force, Fremont, CA, Jun. 2013.
"RFC 5019, The Lightweight Online Ceilificate Status Protocol (OCSP) Profile for High-Volume Environments," A. Deacon, R. Hurst, Internet Engineering Task Force, Fremont, CA, Sep. 2007.
"ATSC 3.0 Standards", retrieved on Feb. 16, 2018 from https://www.atsc.org/standards/atsc-3-0-standards/.
"ATSC Standard: ATSC 3.0 Interactive Content", Advanced Television Systems Committee, Dec. 18, 2017.
"ATSCaster—ROUTE and MMTP server for ATSC 3.0", ENENSYS, Jul. 2018.
"ISO/IEC 23009-5:2017—Information technology—Dynamic adaptive streaming over HTTP (DASH)—Part 5: Server and network assisted DASH (SAND)", May 2017.
I. Bouazizi, "MPEG Media Transport Protocol (MMTP)", Samsung Research America, Mar. 4, 2014.
Tanmay Agnihotri, Graham Anthony Clift, Mimi Vu Tran, "ATSC 3.0 Playback Using MPEG Media Transport Protocol (MMTP)", file history of related U.S. Appl. No. 15/925,190, filed Mar. 19, 2018.
Paul Joseph Hearty, Mark Kenneth Eyer, "Delivery of Information Related to Digital Rights Management (DRM) in a Terrestrial Broadcast System", file history of related U.S. Appl. No. 16/214,933, filed Dec. 10, 2018.
Agnihotri et al., "ATSC 3.0 Playback Using MPEG Media Transport Protocol (MMTP)", related U.S. Appl. No. 15/925,190, Final Office Action dated Mar. 13, 2020.
Agnihotri et al., "ATSC 3.0 Playback Using MPEG Media Transport Protocol (MMTP)", related U.S. Appl. No. 15/925,190, Applicant's response to Final Office Action filed Mar. 19, 2020.
Agnihotri et al., "ATSC 3.0 Playback Using MPEG Media Transport Protocol (MMTP)", related U.S. Appl. No. 15/925,190, Final Office Action dated Mar. 26, 2021.
Agnihotri et al., "ATSC 3.0 Playback Using MPEG Media Transport Protocol (MMTP)", related U.S. Appl. No. 15/925,190, Applicant's response to Final Office Action filed Apr. 9, 2021.
"ATSC Candidate Standard Revision: Signaling, Delivery, Synchronization, and Error Protection", Doc. S33-1-893r4, Apr. 30, 2018.

\* cited by examiner

ATSC 3.0 ADVERTISING NOTIFICATION USING EVENT STREAMS

FIELD

This patent application relates generally to Advanced Television System Committee (ATSC) 3.0 systems advertising notification using event streams.

BACKGROUND

ATSC 3.0 is an Internet Protocol (IP)-based broadcasting standard that provides end-to-end delivery of IP-based content, Using ATSC 3.0, broadband audio-video content may be sent using Moving Picture Experts Group (MPEG) media transport protocol (MMTP) to a receiver for presentation of the content.

SUMMARY

As understood herein, advertising content may be inserted into the AV content during play. With greater specificity, at a playback device that presents content received using ATSC 3.0, "Broadcaster application" or "broadcaster app", which is provided to playback devices by a broadcaster using the Real Time Object Delivery Over Unidirectional Transport (ROUTE) protocol, communicates with receiver player software (sometimes referred to herein as a "receiver app") to present advertising ("ad"). Specifically, the receiver app replaces or inserts advertising content in presented audio-video content based on signals it receives from the broadcaster app.

As further understood herein, the broadcaster app cannot know when the ad will start or stop playing, hence, it cannot know when to update its user interface (UI) if appropriate. This means that the broadcaster app cannot know when to present, for example, a message on the display (via the broadcaster app UI) regarding the subject of the ad, or when to present content different from, but related to, the ad, along with the ad itself.

Accordingly, present principles involve adding an Event Streams 'event' which contains information about ads along with an xlinkResolution signal. This information includes but is not limited to time stamps for when the ads will start and stop. When this xlinkResolution is sent to the Receiver Player, the Receiver Player sends a notification to the Broadcaster App containing the information about start and stop time for presenting the ad. Using this information, the Broadcaster App updates itself, Example usage includes presenting a message on the UI what an ad is about and presenting different content on the UI that are related to the ads.

In an example, the ads Event Stream 'event' is embedded to an ATSC 3.0 xlinkResolution Period element. This Period element is sent back to the Receiver App as a response to an xlinkResolution notification. The Broadcaster App subscribes to and monitors for this event. Once the Receiver App detects the Event Stream, it sends a notification to the Broadcaster App that subscribed to that event.

In this way, if the broadcaster knows that an ad is playing, it can monetize the ad watching behavior. Additionally, embodiments can be used to present different content or update the UI based on what is currently being shown in the ad.

Accordingly, a media playback apparatus includes at least one computer memory that is not a transitory signal and that includes instructions executable by at least one processor to receive Moving Picture Experts Group (MPEG) media transport protocol (MMTP) content from a source of content. The content includes at least one Advanced Television System Committee (ATSC) 3.0 xlink. The instructions are executable to, responsive to receiving the xlink, send, from a receiver app to a broadcaster app, an xlink notification message. The instructions are executable to, responsive to receiving the xlink notification message, resolve, using the broadcaster app, the xlink to render an xlink resolution product, and to send, from the broadcaster app to the receiver app, the xlink resolution product and at least one trigger related to the xlink resolution product. The instructions are executable to send, from the receiver app to the broadcaster app, notification of occurrence of the at least one trigger and to alter at least one user interface (UI) using the broadcaster app responsive to receiving the notification of occurrence of the at least one trigger.

In examples, the source of content includes an Advanced Television System Committee (ATSC) 3.0 system source. The xlink resolution product may include a replacement Period element that in turn can establish or include a replacement ad used by the receiver ad to replace original content in the MMTP content.

In an example, altering the UI includes presenting a message on the UI pertaining to what the xlink resolution product ad is about. In another example, altering the UI includes presenting different content on the UI that is related to the xlink resolution product.

In another aspect, a method includes receiving first content from a source of content and presenting the first content on at least one output device. The method also includes receiving at least one data element indicating replacement content and sending, from a receiver app to a broadcaster app, information related to the data element. The method includes identifying, using the broadcaster app, the replacement content using the information related to the data element. Moreover, the method includes sending, from the broadcaster app to the receiver app, indication of the replacement content to be presented in lieu of original content along with at least one start time of play of the replacement content. As detailed further below, the method includes commencing play of the replacement content at the start time, sending, from the receiver app to the broadcaster app, indication of the start time, and responsive to the indication of the start time, using the broadcaster app to alter presentation on the output device.

In another aspect, an assembly includes at least one display for presenting content, at least one processor for controlling the display, and at least one receiver app executable by the processor to present replacement content on the display responsive to a broadcaster app. The receiver app is configured for sending a signal to broadcaster app pertaining to starting and/or stopping play of the replacement content. In turn, the broadcaster app is configured for altering presentation on the display responsive to the signal.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (MID), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles communicate with other CE devices to undertake present principles, execute the logic described herein, and perform any other functions and/or operations described herein).

Figure 1:
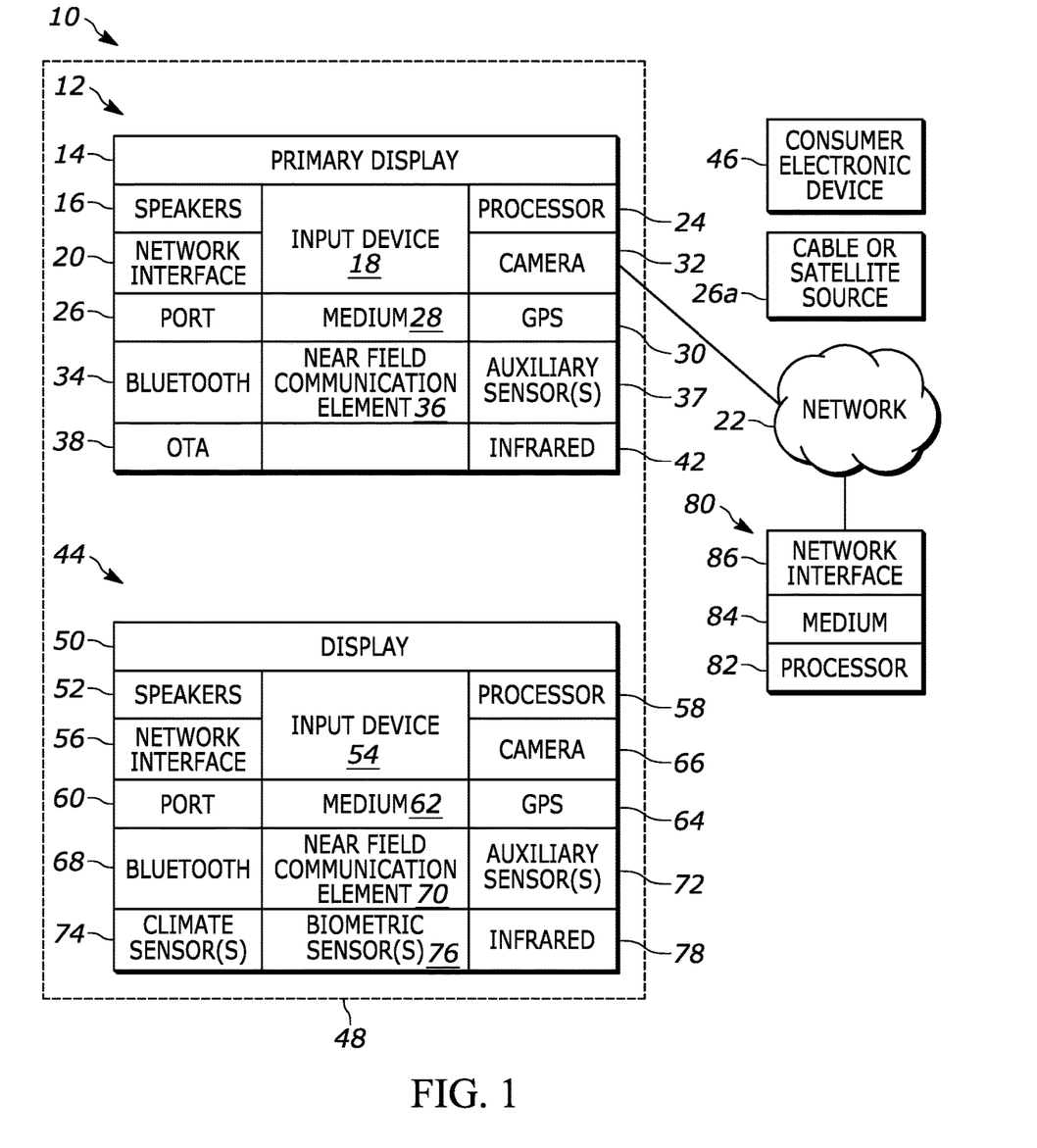
FIG. 1 is a block diagram of an example system including an example in accordance with present principles.

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. Present principles are particularly useful for the circumstance in which the display 14 is not touch-enabled. The AVDD 12 may include one or more speakers 16 for outputting audio in accordance with present principles, and at least one additional input device 18 such as e.g. an audio receiver/microphone for e.g.

entering audible commands to the AVDD 12 to control the AVDD 12. The example AVDD 12 may also include one or more network interfaces 20 for communication over at least one network 22 such as the Internet, an WAN, an LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12, described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor for receiving IR commands from a remote control optical sensor, a speed and/or cadence sensor, a gesture sensor (e.g. for sensing gesture command), etc.) providing input to the processor 24. The AVDD 12 may include an over-the-air TV broadcast port 38 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other computer device types that may include some or all of the components shown for the AVDD 12. In one example, a first device 44 and a second device 46 are shown and may include similar components as some or all of the components of the AVDD 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or transceiver as mentioned above, etc.

In addition to the foregoing, the first device 44 may also include one or more input ports 60 such as, e.g., a HDMI port or a USB port to physically connect (e.g., using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid-state storage. Also in some embodiments, the first device 44 can include a position or location receiver such as but not limited to a cellphone and/or GPS receiver and/or altimeter 64 that is configured to e.g. receive geographic position information from at least one satellite anchor cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g., all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as an IR data association (IRDA) device. A battery may be provided for powering the first device 44. The device 44 may communicate with the AVDD 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired, or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

The devices described below may incorporate some or all of the elements described above.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
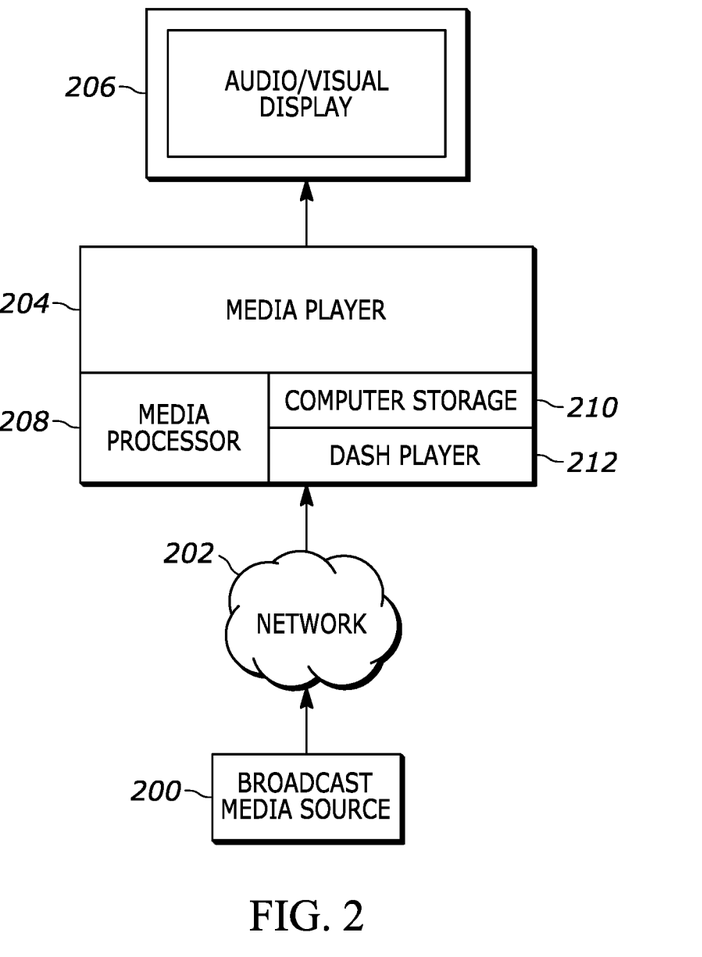
FIG. 2 is a block diagram of a specific example system consistent with present principles.

FIG. 2 illustrates an example environment in which devices that can include some or all of the components discussed above may be employed. A broadcast media source 200 may send, over a network 202, media to a media player 204 for playback of the media, typically in audio-video form on an audio and/or video display 206. The source 200 may be any suitable source such as an Internet server and the network 202 may be a combination of wired and wireless paths implemented by the Internet. The media player 204 may be implemented by any suitable device such as a mobile phone, a personal computer or other type of computer, an Internet-enabled TV, etc. The media player 204 may include one or more media processors 208 accessing one or more computer storages 210 that may contain media playing software such as a DASH player 212.

Figure 3:
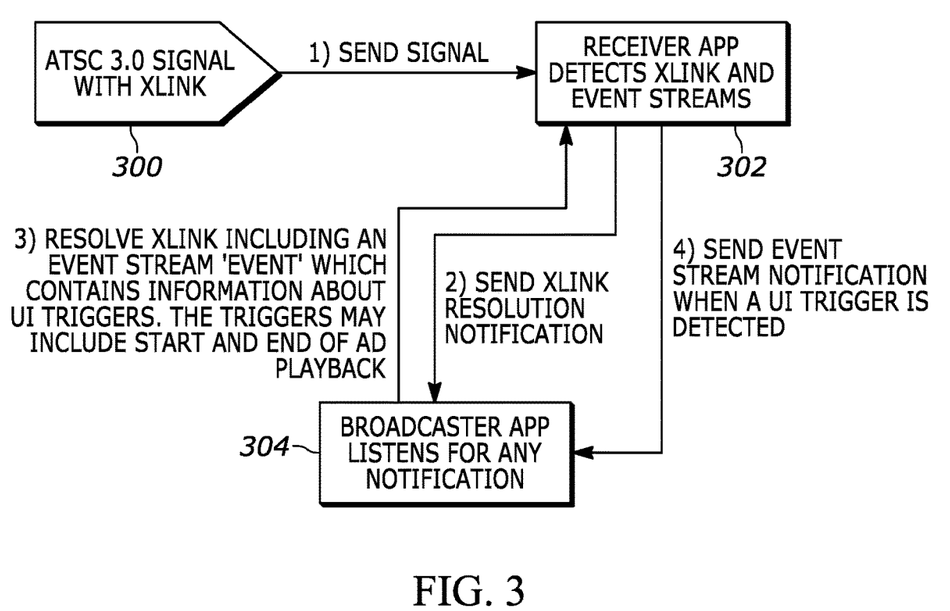
FIG. 3 is a block diagram showing message flows between the receiver app and the broadcast app consistent with present principles.

Turning now to FIG. 3, an ATSC 3.0 signal that includes an XLink data field is sent as indicated by message 1) to a receiver app 302 of a playback device such as the media player 204 in FIG. 2 or any of the playback devices shown herein that are configured for ATSC 3.0 operation. The ATSC 3.0 signal may include, in addition to XLink data, Moving Picture Experts Group (MPEG) media transport protocol (MMTP) content from a source of content. Typically, an XLink field appears as an attribute of an extensible markup language (XML) element that be "resolved" to replace that entire element with the result of the resolution process. This feature is signaled by setting an XLink "show" attribute to the value "embed".

When the receiver app 302 receives an updated media presentation description (MPD) including an XLink in one or more Period elements, the receiver app passes contents of the xlink:href attribute as a parameter to a Broadcaster Application 304 as indicated by message FIG. 3. Message 2) may be referred to as an XLink resolution notification. The Broadcaster app 304 typically is received from an associated broadcaster via a tuned-to broadcast signal or via a back channel over the Internet using a link received in the broadcast channel.

In turn, upon receipt of the XLink resolution notification, the broadcaster app 304 resolves the XLink which results in a replacement Period element, essentially a replacement ad, that the receiver app 302 then uses to replace original content (typically but not exclusively an original ad) received in the content stream. A broadcaster application 304 that directly renders media has access to the updated MPD and can resolve the XLink directly.

This is indicated by message 3) in FIG. 3, in which the broadcaster app 304 sends a message to the receiver app 302 that includes or points to a replacement Period element for presentation as well as user interface (UI) triggers, which in the example shown include start and end times of playback of the replacement Period element (replacement ad). The message 3) in FIG. 3 may be referred to as an Event Stream which includes the UI triggers.

The receiver app 302 then detects the Event Stream from the broadcaster app and in response thereto inserts the indicated replacement Period element at the indicated triggers, i.e., at the start end times indicated in message 3) in FIG. 3. Moreover, as each UI trigger is detected by the replacement ad, e.g., by noting using an internal clock the occurrence of the start and end times in the UI triggers from the broadcaster app and/or by noting the start and end of play of the replacement Period element, the replacement ad sends a message 4) back to the broadcaster app indicating that a trigger has occurred. In this way, the broadcaster app knows when the replacement Period element has commenced play and when it has completed play, so that the broadcaster app can configure its UI accordingly as discussed further below. Because the broadcaster app may be terminated by a channel change to another broadcast channel, it may offload ad play statistics to a local or remote storage device in real time as the statistics are gathered.

Thus, in an example, the ad's Event Stream 'event' is embedded to an ATSC 3.0 xlinkResolution Period element. This Period element is sent back to the Receiver App as a response to an xlinkResolution notification. The Broadcaster App subscribes to and monitors for this event. Once the Receiver App detects the Event Stream, it sends a notification to the Broadcaster App that subscribed to that event. Other means consistent with the relevant protocol in use may be used to insert replacement ads into content while informing the broadcaster app of the start and stop times of replacement ad play.

In this way, if the broadcaster knows that an ad is playing, it can monetize the ad watching behavior. Additionally, embodiments can be used to present different content or update the UI based on what is currently being shown in the ad.

Figure 4:
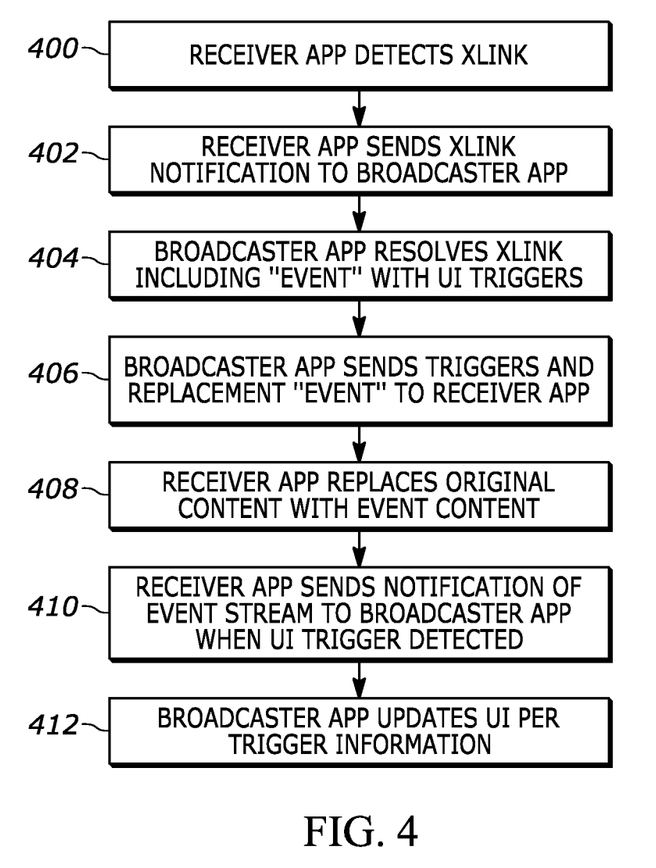
FIG. 4 is a flow chart of example logic related to FIG. 3.

FIG. 4 reflects the above disclosure in flow chart format. Commencing at block 400, the receiver app detects an XLink in the signal, such as but not limited to an ATSC 3.0 signal. In response, the receiver app sends an Mink notification signal to the broadcaster app at block 402, with the broadcaster app resolving the XLink at block 404 along with identifying the UI triggers.

Proceeding to block 406, the broadcaster app sends the UI triggers and the replacement Period element (or a pointer thereto) to the receiver app. The receiver app in response at block 408 replaces the original content with the replacement Period element at the indicated trigger times. Moving to block 410, as each UI trigger is detected, the receiver app sends an event stream notification to the broadcaster app indicating the occurrence of a trigger to enable the broadcaster app to update its UI consistent therewith at block 412.

Note that additional triggers between the start and end play triggers may be used so that, e.g., at block 410 every second of ad play another trigger notification may be provided to the broadcaster app indicating that the ad is still being played. In this way, should a viewer change channels before the end of ad play, the broadcaster app knows how much of the ad was watched by noting the last notification and the corresponding location on the ad (e.g., halfway through play, 20 seconds through play, etc.)

Figure 5:
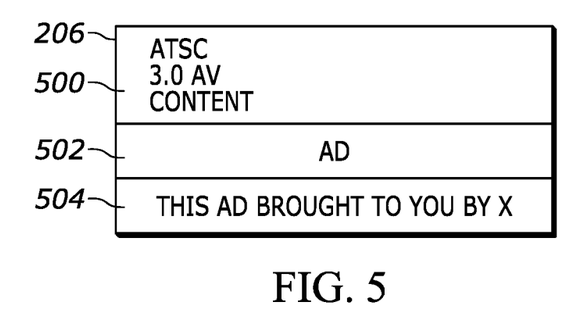
FIGS. 5 and 6 are example user interfaces (UI) generated in part by the broadcast app consistent with present principles.
Figure 6:
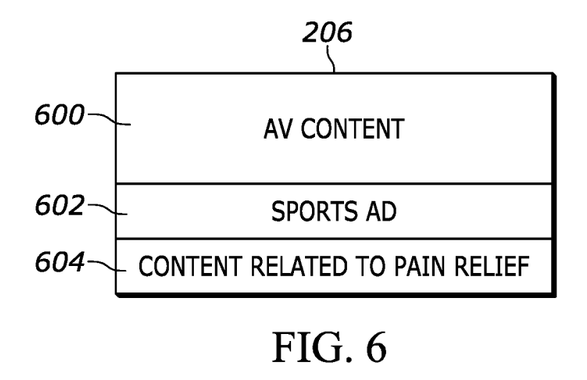

FIGS. 5 and 6 illustrate non-limiting examples of actions the broadcaster app might take at block 412 in response to receiving an event stream notification from the receiver app indicating, e.g., that a replacement Period element has begun playback on the playback device. In an example, a playback device such as the media player 204 in FIG. 2 presents audio-video content 500 which may be ATSC 3.0 AV content on the display 206. A replacement Period element such an ad 502 that replaces original content in the stream may also be presented on the display as shown, it being understood that instead of showing the content 500 and ad 502 simultaneously with each other in separate windows, the ad 502 may be presented in lieu of the content 500.

In any case, a message 504 that is typically related to the add 502, such as by identifying the subject or sponsor of the ad, is presented by the broadcaster app responsive to receiving the UI trigger from the receiver app. When a subsequent UI trigger notification is received, such as a stoppage of ad 502 play, the broadcaster app can update the UI by removing the message 504 from display.

FIG. 6 illustrates another example in which AV content 600 is presented on the display along with a replacement Period element such as an ad, in the example shown, related to sports. Upon receipt of a notification from the receiver app that a trigger has occurred, in this case, the start of play of the ad 602, auxiliary content 604 may be presented by the broadcaster app that is related to the ad 604. In the example shown, the auxiliary content may be related to pain relief for athletes.

Figure 7:
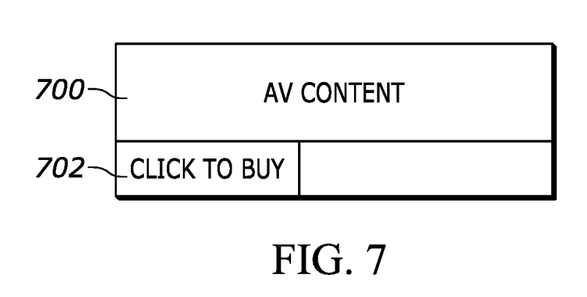
FIG. 7 is an example UI generated after ad play.

FIG. 7 shows that responsive to the end of ad play as indicated by a notification of the end trigger, the broadcaster app can present AV content 700 on the display along with a selector 702 that may be selected using, e.g., a remote control to purchase the product that was the subject of the ad.

The Advanced Television Systems Committee (ATSC) Standard: ATSC 3.0 Interactive Content, A/344:2017 is incorporated herein by reference.

It will be appreciated that whilst present principals have been described with reference to some example embodiments, these are not intended to be limiting, and that various alternative arrangements may be used to implement the subject matter claimed herein.

What is claimed is:

1. A method comprising:
receiving first content from a source of content;
presenting the first content on at least one output device;
receiving at least one data element indicating replacement content;
sending, from a receiver app to a broadcaster app, information related to the data element;
identifying, using the broadcaster app, the replacement content using the information related to the data element;
sending, from the broadcaster app to the receiver app, indication of the replacement content to be presented in lieu of original content along with at least one start time of play of the replacement content;
commencing play of the replacement content at the start time;
sending, from the receiver app to the broadcaster app, indication of the start time; and
responsive to receiving from the receiver app the indication of the start time, the broadcaster app updating itself at least in part by presenting a message on a user interface (UI) about the replacement content, or presenting content on the UI that is related to the replacement ad, or both.

2. The method of claim 1, wherein the first content comprises Advanced Television System Committee (ATSC) 3.0 content.

3. The method of claim 1, wherein the at least one data element indicating replacement content comprises xlink information.

4. The method of claim 1, wherein the replacement content comprises at least one replacement Period element.

5. The method of claim 4, wherein the replacement Period element comprises at least one replacement ad used by the receiver ad to replace original content.

6. The method of claim 1, comprising using the broadcaster app to alter presentation on the output device by presenting a message on the at least one output device pertaining to the replacement content.

7. The method of claim 1, comprising using the broadcaster app to alter presentation on the output device by presenting different content on the at least one output device that is related to the replacement content.

8. An assembly for playing content, comprising:
at least one display for presenting content;
at least one processor in the assembly for playing content for controlling the display;

at least one receiver app executable by the processor in the assembly for playing content to present replacement content received by the assembly from a broadcast system on the display responsive to a broadcaster app executed by the processor in the assembly for playing content, the receiver app configured for sending to the broadcaster app signals between start and end of play of the replacement content so that in event of a channel change before ending presentation of the replacement content, the broadcaster app knows how much of the replacement content was watched.

9. The assembly of claim 8, wherein the content comprises an Advanced Television Systems Committee (ATSC) 3.0 xlink associated with the replacement content, the receiver app being configured for, responsive to receiving the xlink, sending to the broadcaster app, an xlink notification message.

10. The assembly of claim 9, wherein the broadcaster app is configured for, responsive to receiving the xlink notification message, resolving the xlink to render a replacement Period element establishing the replacement content.

11. The assembly of claim 10, wherein the broadcaster app is configured for sending to the receiver app the replacement Period element and at least one trigger related to the replacement Period element, the receiver app being configured for sending to the broadcaster app notification of occurrence of the at least one trigger, the notification establishing the signal.

12. The assembly of claim 8, wherein altering presentation on the display comprises presenting a message pertaining to the replacement content.

13. The assembly of claim 8, wherein altering presentation on the display comprises presenting different content on the display that is related to the replacement content.

14. The method of claim 1, wherein the method is executed by a display device for playing the replacement content and executing the broadcaster app and receiver app.

* * * * *